United States Patent
Kamiya et al.

(10) Patent No.: US 6,175,772 B1
(45) Date of Patent: Jan. 16, 2001

(54) USER ADAPTIVE CONTROL OF OBJECT HAVING PSEUDO-EMOTIONS BY LEARNING ADJUSTMENTS OF EMOTION GENERATING AND BEHAVIOR GENERATING ALGORITHMS

(75) Inventors: Tsuyoshi Kamiya; Masaya Sakaue, both of Iwata (JP)

(73) Assignee: Yamaha Hatsudoki Kabushiki Kaisha, Shizuoka-ken (JP)

(*) Notice: Under 35 U.S.C. 154(b), the term of this patent shall be extended for 0 days.

(21) Appl. No.: 09/059,278

(22) Filed: Apr. 13, 1998

(30) Foreign Application Priority Data

Apr. 11, 1997 (JP) .................................................. 9-093380

(51) Int. Cl.⁷ ...................................................... G06F 15/18
(52) U.S. Cl. .................................................. 700/31; 701/1
(58) Field of Search ........................... 700/245, 1, 19, 700/259, 31; 701/1, 59; 382/104

(56) References Cited

U.S. PATENT DOCUMENTS

| | | | |
|---|---|---|---|
| 5,170,935 | * 12/1992 | Federspiel et al. | 236/44 C |
| 5,367,454 | * 11/1994 | Kawamoto | 700/259 |
| 5,453,929 | * 9/1995 | Stove | 701/1 |
| 5,832,189 | * 11/1998 | Tow | 700/259 |
| 5,963,710 | * 10/1999 | Masumoto | 700/259 |

* cited by examiner

Primary Examiner—Thomas C. Lee
Assistant Examiner—Albert Wang
(74) Attorney, Agent, or Firm—Knobbe, Martents, Olson & Bear, LLP

(57) ABSTRACT

A control method for controlling operation of an object used by a user in an environment includes the steps of: defining pseudo-emotions of the object for deciding output of the object, in relation to the user's state; formulating emotion generation algorithms to establish the relationship between the user's state and the pseudo-emotions; formulating behavior decision algorithms to establish the relationship between input, including the pseudo-emotions, and the behavior of the object; detecting the user's state; generating a pseudo-emotion of the object based on the user's state using the emotion generation algorithms; making the object behave based on the user's state and the pseudo-emotion using the behavior decision algorithms; evaluating reaction of the user in response to the behavior of the object; and if the reaction of the user does not match the pseudo-emotion of the object in the emotion generation algorithms, adjusting at least either of the emotion generation algorithms or the behavior decision algorithms, followed by learning the adjustment. The object can detect the user's state in a visual, tactile, and auditory manner as do humans, and can act upon generation of pseudo-emotions based thereon. Thus, natural communication between the user and the object can be performed, i.e., more human like communication can be established.

11 Claims, 13 Drawing Sheets

Rub right and left
without releasing the hand

Rub once

Hold in place

Rub in one direction
as if rubbing along fur.
Release the hand when returning

USER ADAPTIVE CONTROL OF OBJECT HAVING PSEUDO-EMOTIONS BY LEARNING ADJUSTMENTS OF EMOTION GENERATING AND BEHAVIOR GENERATING ALGORITHMS

BACKGROUND OF THE INVENTION

This invention relates to a system for controlling an object interacting with a user and environment, and particularly to that for controlling an object capable of expressing pseudo-emotions in response to the user or environment by using algorithms, thereby creating behavior highly responsive to the states of the user or environment.

Heretofore, various controlling methods have been available for controlling an object in accordance with a user's demand.

In such controlling methods, normally, the user sets a target value at output which the user wants, and the object is controlled in such a way that the output matches the target value, while feeding the output back to a control system which compares the feedback and the target value to adjust the output. In the above, by feeding the output back to the system to adjust the output, the output of the object to be controlled can approach the target value, thereby achieving control satisfying the user's preference.

The aforesaid target value is set at a value basically satisfying the request by the user who uses the object. In practice, methods of setting a target value include a method of setting an appropriate target value by the user at every time the user uses the object, e.g., setting a temperature of an air conditioner, and a method of setting an appropriate target value by a manufacturer to satisfy a wide range of users when the object is manufactured, e.g., setting parameters of an engine for a vehicle when manufactured.

However, in conventional methods, because a principle goal is to obtain output in accordance with a target value, when the user inputs a target value directly into an object, if an incorrect target value is mistakenly inputted, for example, the object is controlled based on the incorrect target value. Satisfactory results cannot be obtained. In the above, no matter how accurately the air conditioner controls the temperature, i.e., outputs the set target value, the user often must reset the target temperature as the user notices the temperature is not the one the user really wants after the user feels the output temperature controlled by the air conditioner. This is because it is difficult for the user to precisely and numerically find the right temperature, and to input the temperature value into the air conditioner.

Further, when the target value is set in advance by a manufacturer, for example, because the user who uses the object has different characteristics from other users, it is impossible to set in advance a universal target which satisfies all users.

As descried above, in the conventional methods, because the principle goal is to obtain output in accordance with a target value which is set directly by the user or set in advance by the manufacturer, the output is likely to be stable and predictable. However, the output may not be the one the user wants, and may not reflect the user's intent or emotions which are not directly expressed or inputted.

In addition, in the conventional methods, because the principle goal is to obtain output in accordance with a target value, naturally, the output is likely to be predictable. Thus, if such a control system is applied to a toy, for example, behavior of the toy is inevitably restricted to predictable mechanical movement. As a result, the user loses interest in or gets tired of playing with the toy.

SUMMARY OF THE INVENTION

An objective of the present invention is to solve the above problems associated with conventional control systems, and to provide a control system which allows outputting an adequate value ultimately giving the user more satisfaction than does a value obtained from the user's direct order, particularly using pseudo-emotions caused in the object in response to the user and environment.

One important aspect of the present invention attaining the above objective is to provide a control method for controlling operation of an object used by a user in an environment, said object capable of receiving signals of variable conditions which represent at least a state of the user and which are associated with operation of the object, said object capable of being programmed to behave in response to the received signals, said method comprising the steps of: defining pseudo-emotions of the object, which are elements for deciding output of the object, in relation to the signals; formulating emotion generation algorithms to establish the relationship between the signals and the pseudo-emotions; formulating behavior decision algorithms to establish the relationship between input, including the pseudo-emotions, and the behavior of the object; detecting signals of variable conditions and inputting the signals into the object; generating a pseudo-emotion of the object based on the signals using the emotion generation algorithms; making the object behave based on the signals and the pseudo-emotion using the behavior decision algorithms; evaluating reaction of the user in response to the behavior of the object; and if the reaction of the user does not match the pseudo-emotion of the object in the emotion generation algorithms, adjusting at least either of the emotion generation algorithms or the behavior decision algorithms, followed by learning the adjustment.

According to the present invention, the object is always allowed to regulate to a certain degree its behavior based on its own pseudo-emotions. The object is formed in such a way as to adjust the emotion generation algorithms and the behavior decision algorithms and to learn them based on the reaction by the user in response to the object's own behavior, and thus, the recognition efficiency of recognizing the user's intentions and/or emotions increases. Further, the object can detect the user's state in visual, tactile, or auditory manner as do humans, and can act upon generation of pseudo-emotions based thereon. Thus, natural communication between humans and objects can be performed, i.e., more human like communication can be established.

In the above, preferably, the control method further comprises the steps of: recognizing an intention/emotional expression of the user based on the signals of variable conditions, and using the intention/emotional expression of the user as the signals for formulating the emotion generation algorithms and for generating the pseudo-emotion of the object. The intention/emotional expression of the user can also be used as the input for formulating the behavior decision algorithms and for deciding the behavior of the object. In the above, preferably, the control method further comprises the steps of deducing preference/habit of the user from the recognized intention/emotional expression of the user, learning the deduced result, and using the learned deduced result for recognizing the intention/emotional expression of the user.

BRIEF DESCRIPTION OF THE DRAWINGS

FIG. 3 is a schematic diagram showing the processing flow of dissatisfaction detection with reference to dissatisfaction with temperature control.

DETAILED DESCRIPTION OF THE PREFERRED EMBODIMENTS OF THE INVENTION

The control system for controlling an object using pseudo-emotions of the present invention (hereinafter, referred to simply as "control system") will be explained with reference to several embodiments depicted in the Figures.

Basic Structures of Communication Partner Robot

Figure 1:
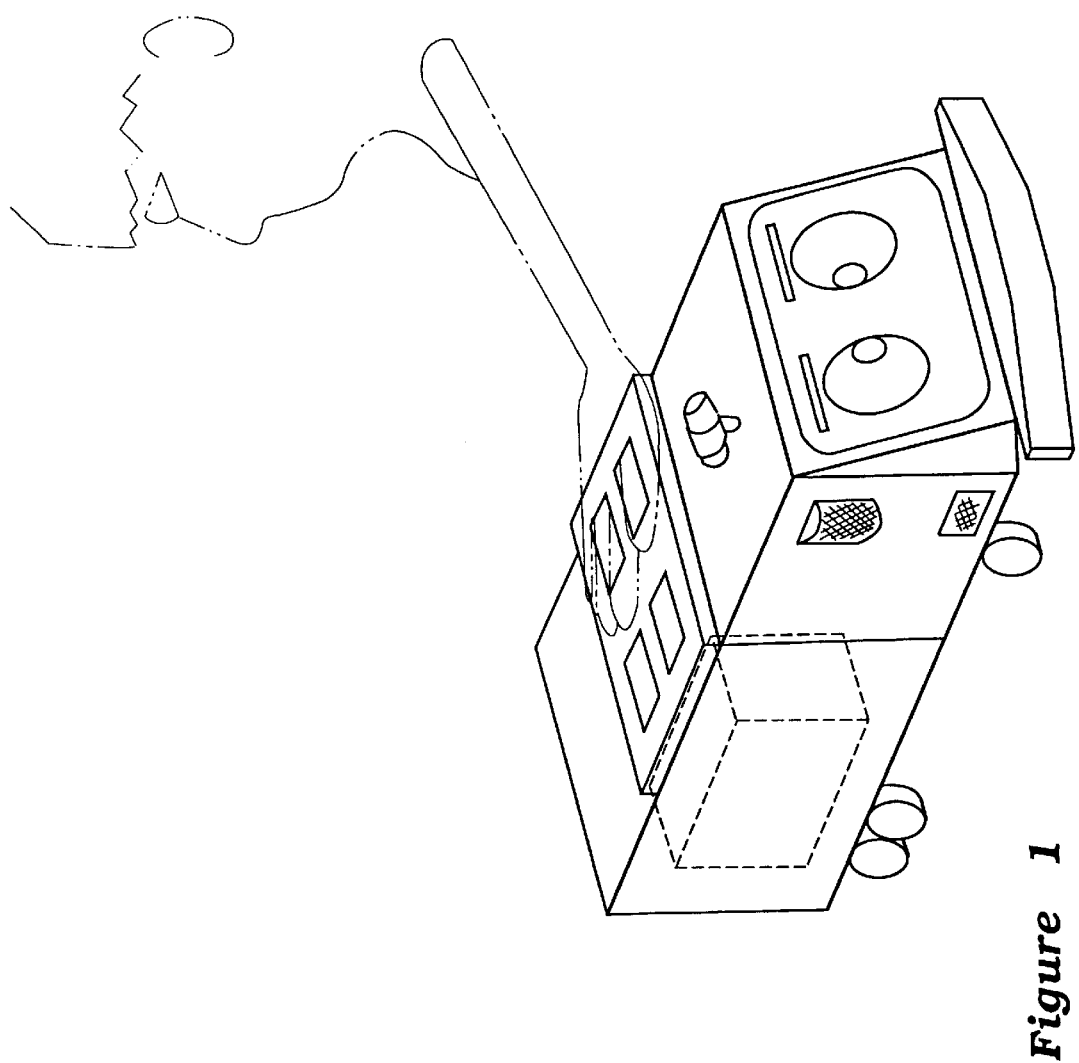
FIG. 1 is a schematic view showing a communication partner robot to which the control system according to the present invention is adapted.
Figure 2:
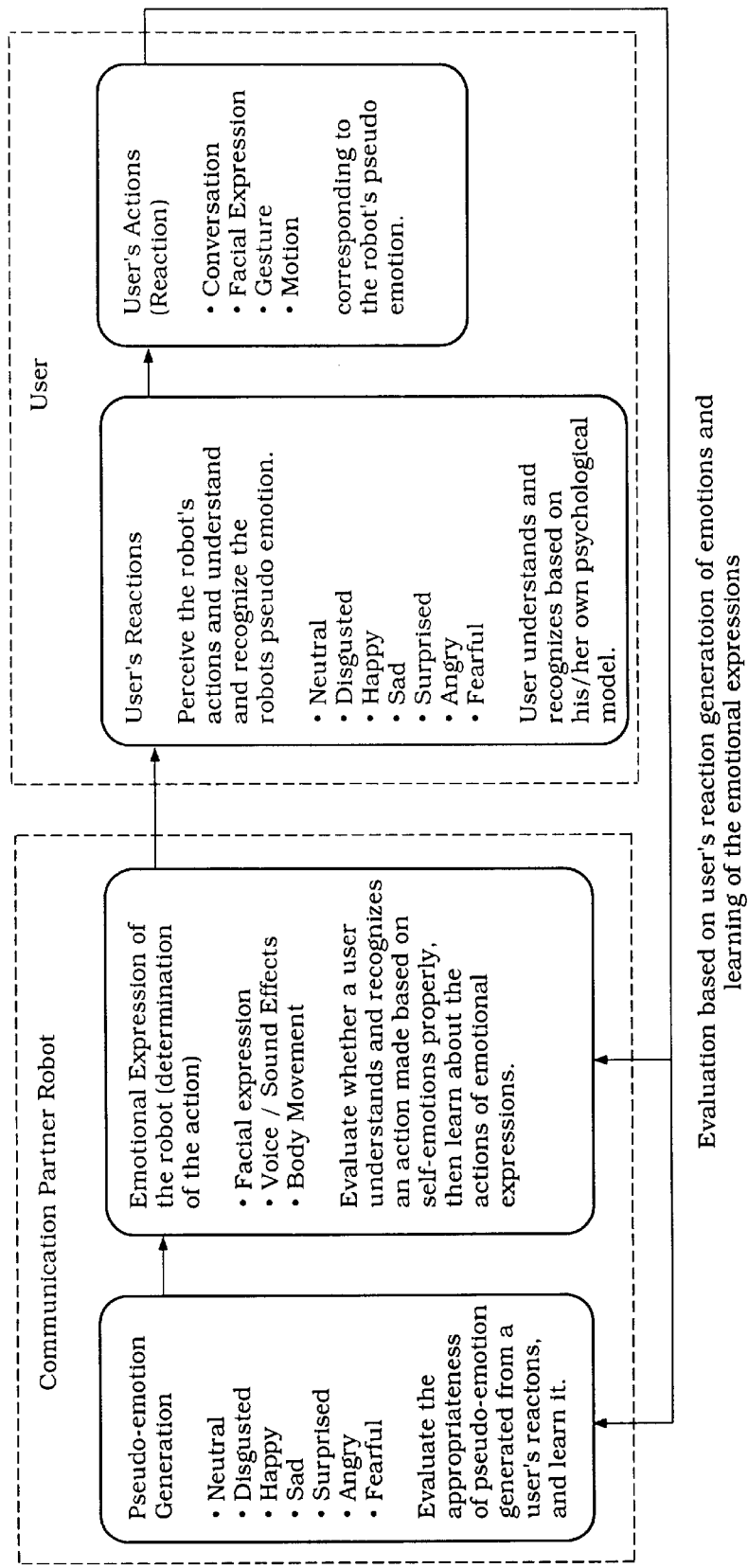
FIG. 2 is a schematic diagram showing the relationship between the user and the robot.

FIG. 1 is a schematic view showing a communication partner robot (hereinafter, referred to simply as "robot") to which the control system according to the present invention is adapted, and FIG. 2 is a schematic diagram showing the relationship between the user and the robot.

This robot 1 generates its own pseudo-emotions based on the user's conditions, user's intention or emotions, and the like, and expresses the pseudo-emotions by several behavioral means. Based on a response from the user in response to the expression of its own pseudo-emotions, the robot determines whether the generated pseudo-emotions are correct, and also determines whether the user understands and recognizes correctly the behavior created by the pseudo-emotions. In this way, the robot is controlled to undergo learning adequate pseudo-emotions to be generated and adequate behavior for expressing the pseudo-emotions and to evolve. By doing the above, the robot can develop its own pseudo-emotions and expression of the pseudo-emotions through communications with the user.

Sensing Means

The robot 1 comprises a CCD camera 2 as a visual detection means, a pressure-sensing sensor 4 and an approach-sensing sensor 6 as touch detection means, and a microphone 8 as a hearing-detection means. By using these sensing means 2, 4, 6, and 8, the robot 1 detects by sense the state of the user, such as a tone of voice, facial expressions, and gestures, and the operational environments where the robot is used.

The CCD camera 2 is installed on the top of the head and can be set in any direction via a universal joint. For example, the robot can be controlled in such a way that the robot automatically moves toward an object, such as a human and animal, which is a cause or source of information such as changes in temperature and sound. Image information such as facial expressions of the user and surrounding environments is supplied to a controller 20.

The pressure-sensing sensor 4 may be installed in the lower front of the robot 1 so that when the robot has actual contact with an obstacle, such information is provided to the controller 20.

In addition, the approach-sensing sensor 6 is comprised of four units located on the top of the robot's body (i.e., the back of the robot 1 if the robot is considered to have a face, a head, a body, legs or driving means). The four units are electrostatic approach-sensing sensor units 6FL, 6FR, 6RL, and 6RR disposed in the front left, front right, rear left, and rear right, respectively. These sensors provide to the controller 20 information regarding the state of ON or OFF and the duration of each ON and OFF.

The microphone 8 is installed on the side of the head of the robot 1, and provides information to the controller 20 upon collecting sound/voices arose around the robot 1.

Behavioral Means

The robot 1 comprises a display 10 to display its own facial expression and other specific information, a speaker 12 to output words, notes, roars, or effective sounds, and a drive means 14 to move in autonomic manner. By using the above, the robot 1 can act in accordance with the user's intent as necessary, while expressing its own pseudo-emotions.

Controller

As described above, the robot 1 generates its own pseudo-emotions, recognizes the user's intent and desires (emotional expression), and recognizes an operable range, by using the built-in controller 20, based on information regarding the user's state and/or surrounding environments obtained by each of the sensing means 2, 4, 6, and 8. Based on the generated pseudo-emotions, actions of the display 10, the speaker 12, and the drive means 14 are desired, and the robot 1 starts an action to achieve the target in accordance with the user's intent or starts emotional behavior giving priority to expressed emotions.

In addition, the robot 1 is controlled by the controller 20 in such a way as to evaluate adequacy of the generated pseudo-emotions and adequacy of actions by detecting by sense the user's reaction caused by its own behavior, and to learn the evaluation results, thereby undergoing evolution.

Structures of Controller

Figure 3:
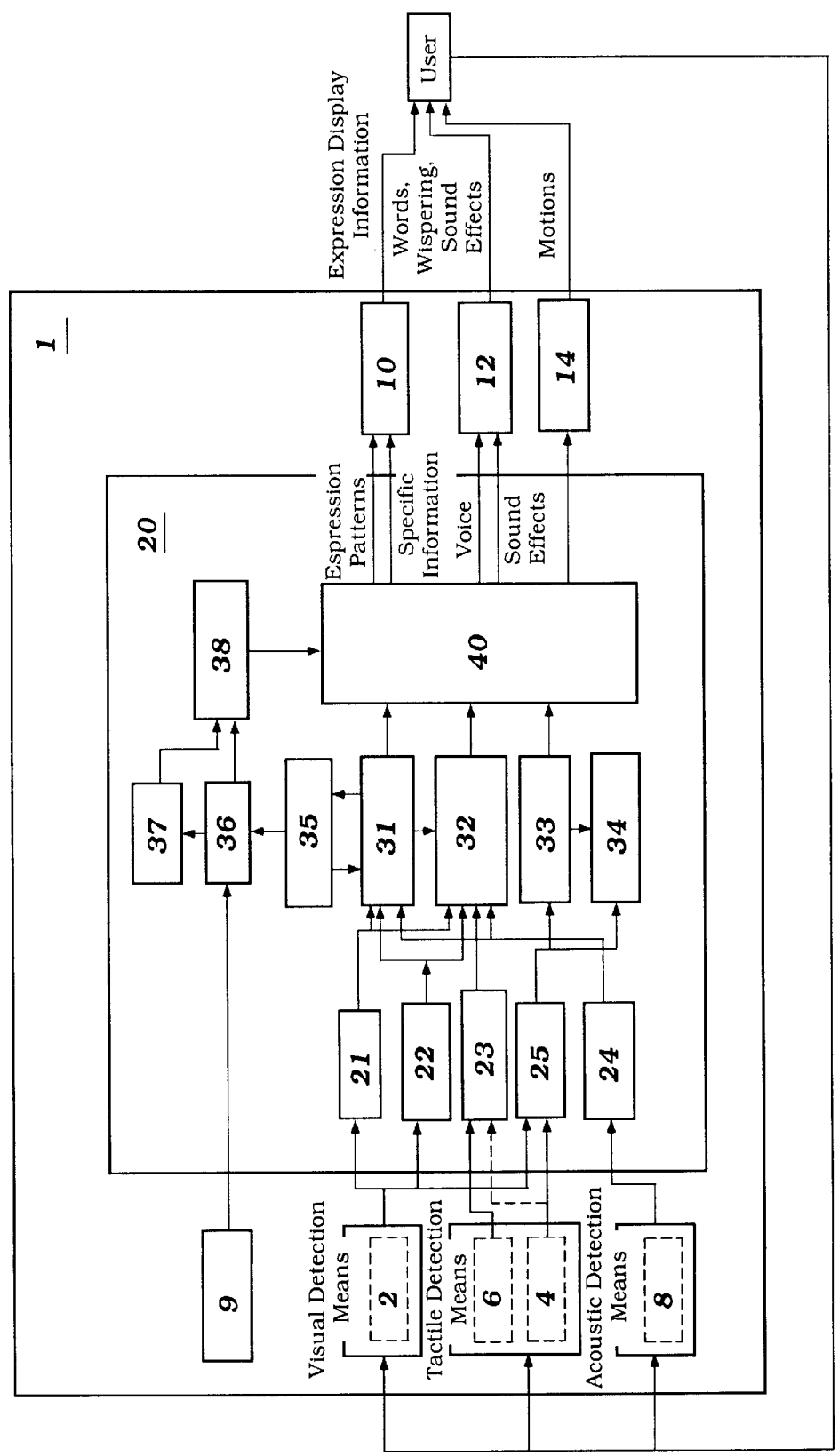
FIG. 3 is a schematic diagram showing the structures of the controller 20 illustrated in FIG. 1.
Figure 4A:
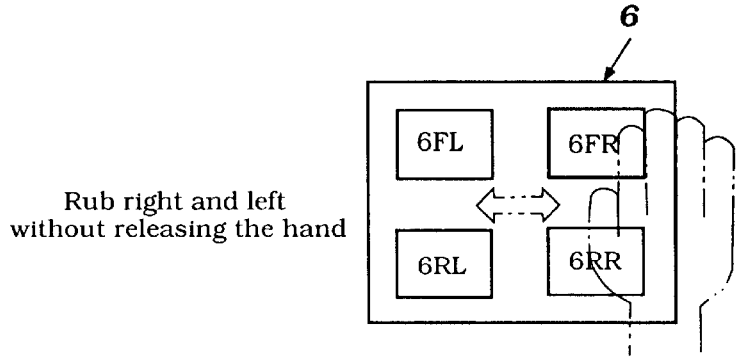
FIGS. 4a, 4b, 4c, 4d show the patterns of rubbing the robot at the four electrostatic approach-sensing sensor units illustrated in FIG. 1.
Figure 4B:
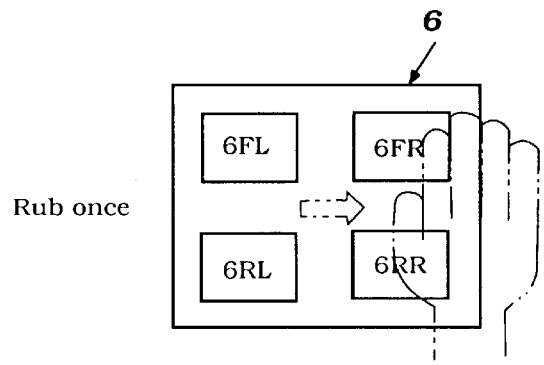
Figure 4C:
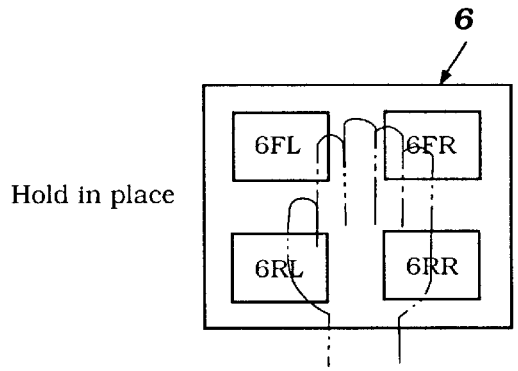
Figure 4D:
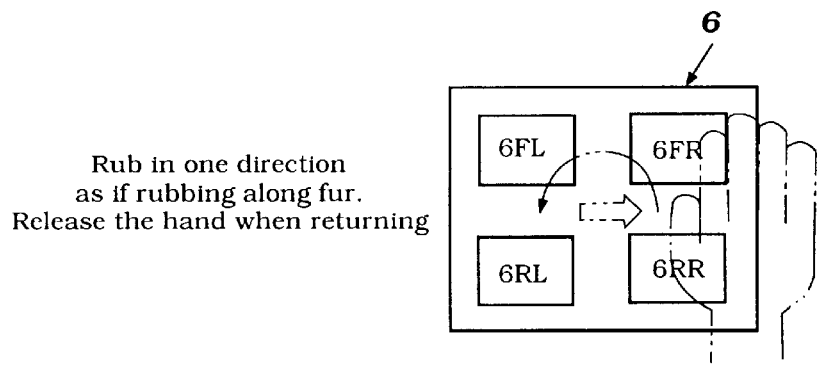

The structures of the controller 20 will be explained further below. FIG. 3 is a schematic diagram showing the controller 20.

The controller 20 receives information from the aforesaid sensuous detection means 2, 4, 6, and 8, and information from an external information source 9 such as a network as necessary.

The controller 20 comprises a facial expression detection unit 21, a gesture detection unit 22, a rubbing/hitting detection unit 23, a sound/voice detection unit 24, and a surrounding environment detection unit 25, and by using these detection units 21–25, the controller 20 detects information about the state of the user and/or the surrounding environment.

In practice, the facial expression detection unit 21 and the gesture detection unit 22 visually detect the user's expression and/or gesture, using an appropriate image recognition system.

The rubbing/hitting detection unit 23 tactilely detects the user's actions of rubbing and/or hitting the robot 1, based on input information from the pressure-sensing sensor 4 and the approach-sensing sensor 6.

Further, the rubbing/hitting detection unit 23 conducts two-step detection: detection of contacted location and detection of being rubbed, i.e., the unit 23 detects first whether the user rubs the robot 1, and if the user rubs the robot, second how the user rubs the robot 1. The detection of contacted location is conducted in such a way that among the electrostatic approach-sensing sensors, if either sensor unit 6FL (front left) or 6FR (front right) is ON, the contact is judged to be located in the front; if either sensor unit 6RL (rear left) or 6RR (rear right) is ON, the contact is judged to be located in the rear; if either sensor unit 6FL (front left) or 6RL (rear left) is ON, the contact is judged to be located on the left; if either sensor unit 6FR (front right) or 6RR (rear right) is ON, the contact is judged to be located on the right, thereby detecting which part of the approach-sensing sensor 6 is touched by the user. Rubbing detection is established when the contacted location moves from the front to the rear, from the right to the left, or the like. FIGS. 4a, 4b, 4c, and 4d show the patterns of rubbing the robot 1 at the four electrostatic approach-sensing sensor units. In the above, in rubbing detection, a manner of rubbing by the user is detected based on the duration of activation of each sensor unit: how long each sensor unit is kept ON or OFF. For example, when the user does not move the hand touching the sensor unit(s) for a long time, it is judged that the robot 1 is being held (FIG. 4c); when the user rubs right and left at appropriate intervals without releasing the hand, it is judged that the robot 1 is being rubbed (FIG. 4a); when the user rubs in one direction as if rubbing along fur and releases the hand when returning, it is judged that the robot 1 is being rubbed (FIG. 4d); when any sensor unit is activated (an ON signal is detected) once for a very short time while all of the sensor units are OFF, it is judged that the robot is suddenly being hit by the user; when ON signals are detected continuously at a certain interval, it is judged that the robot 1 is being hit repeatedly. Further, in addition to the approaching-sensing sensor 6, by installing a pressure-sensing sensor at the same location as the approach-sensing sensor 6, it can be detected whether the user touches the robot 1 softly or roughly, or how strong the user hits the robot 1 if hitting the robot 1.

The sound/voice detection unit 24 auditorily detects the user's voice and/or sounds around the robot, based on information from the microphone 8, and analyzes or recognizes voice information, using an appropriate voice recognition means: e.g., recognition of the contents of a conversation by the user, identification of the individual user, or identification of sound around the robot.

Further, the surrounding environment detection unit 25 tactually recognizes information about obstacles around the robot based on input information from the pressure-sensing sensor 4, and visually recognizes information about the obstacle by an appropriate image recognition means based on input image information from the CCD camera 2.

Recognition Units

The controller 20 generates pseudo-emotions at a pseudo-emotion generation unit 32 upon recognition of the user's intent and emotional expression at an intent/emotion recognition unit 31 based on the detection results by the aforesaid detection units 21–25. The controller 20 also recognizes an actually movable range of the robot 1 at a movable range recognition unit 33.

Intent/Emotion Recognition Unit

In practice, the aforesaid intent/emotion recognition unit 31 may comprise a neural network, for example, which receives information about the user's preferences and habits obtained from a preference/habit learning unit 35 described later, as well as information about the state of the user obtained from the facial expression detection unit 21, the gesture detection unit 22, and the sound/voice detection unit 23, and which outputs the user's intention/emotional expression based on the input information, thereby recognizing information about the user's intention/emotional expression based on the output value. Further in practice, when the aforesaid intention/emotion recognition unit 31 is comprised of a neural network(s), the neural network can be constructed in such a way as to allow selective recognition of the user's emotional expression by causing the neural network to undergo learning in advance, for example, the relationship between several patterns of emotions and information including the user's preference/habits and the state of the user. The several patterns of emotions are obtained by categorizing in advance the emotional expressions of the user into several patterns of emotions such as neutral, disgusted, happy, sad, surprised, angry, and fearful. The information on the state of the user is obtained from the facial expression detection unit 21, the gesture detection unit 22, and the sound/voice detection unit 23, and the information on the user's preferences and habits is obtained from the preference/habit learning unit 35.

Regarding recognition of the user's intentions using a neural network, selective recognition of the user's intentions can be established by causing the neural network to undergo advance learning the relationship between pieces of information including the user's state and preferences/habits, and the contents of intentions. The contents of intentions, which are learned in advance by the neural network, are those the user possibly requests to the robot 1 such as "stop", "run", and "return".

The information on the user's intentions and/or emotional expressions recognized at the intention/emotional expression recognition unit 31 is used as one piece of information for generating pseudo-emotions and as information for evaluating adequacy of the generated pseudo-emotions at the pseudo-emotion generation unit 32, and is used as information for creating target-achievement motion in accordance with the user's intentions/emotional expressions and as information related to reaction from the user in response to the robot's behavior at a behavior decision means 40, and is further used as teacher data related to the user's preferences/habits at the preference/habit learning unit 35.

The intention/emotional expression recognition unit 31 may be constituted to learn and adjust recognition algorithms in such a way as to eliminate a discrepancy between the estimated response from the user in response to the robot's own behavior which is originally a response to the state of the user, and the user's actually evaluated intentions and/or emotional expressions.

Further, preferably, the patterns of emotional expressions and the contents of the user's intentions may be recognized by subdividing the patterns (e.g., disgusted and happy) and the contents (e.g., "run" and "stop") into several levels. In the above, when recognized by subdividing the user's intentions and/or emotional expressions, adjustment of the recognition algorithms can be achieved in the subdivided levels of each of the patterns and the contents of intentions. In practice, for example, when the user orders the robot 1 to "run", the robot 1 recognizes the user's intention "run" in level 2 (e.g., run normally) based on various states such as the facial expression of the user when saying "run", thereby behaving accordingly. As a result, if the robot 1 recognizes that the user's response shows dissatisfaction, the robot judges that there is a discrepancy between the user's recognized intention and the user's actual intention, and the robot changes the outcome of the recognition of the user's intention to the level where the user is judged to be satisfied (e.g., level 3: run fast, or level 1: run slowly), thereby learning the result. By constructing the structure as above, the robot 1 is able to implement the user's order, e.g., "run", by further recognizing the contents which the user does not expressly order, e.g., the speed or a manner of running.

In the above, the recognition at the intention/emotional expression recognition unit 31 need not be constructed by a neural network, but can be constructed by other means such as a map which can make various states of the user detected by the detection units correspond to the categorized emotional patterns.

Pseudo-Emotion Generation Unit

The pseudo-emotion generation unit 32 stores basic emotional models obtained by categorizing pseudo-emotions required of the robot 1 into several emotional patterns which are, in this embodiment, neutral, disgusted, happy, sad, surprised, angry, and fearful. The pseudo-emotion generation unit 32 selectively generates a pseudo-emotion from the above seven basic emotional models in accordance with the current situation, by using a map or a function which connects information on the user's state, information on the user's intentions/emotional expressions, and the aforesaid each emotional model, or by using a neural network which has learned the relationship between information on the user's state, information on the user's intention/emotional expression, and the aforesaid each emotional model.

Figure 5:
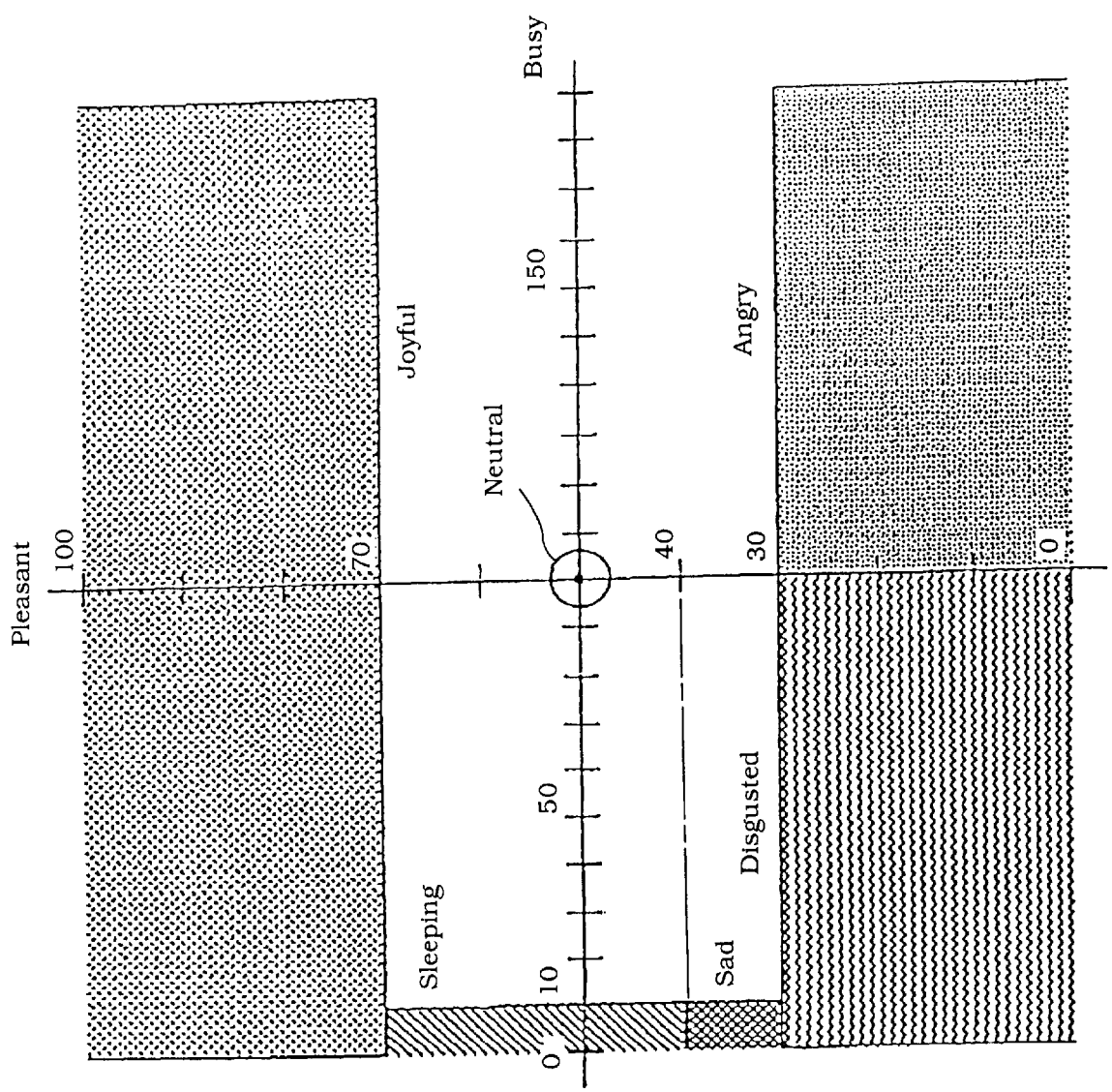
FIG. 5 shows a map for making output values of the detection unit 23 to correspond to five emotional models: neutral, happy, disgusted, angry, and sad, among the aforesaid seven emotional models.

For example, FIG. 5 shows a map for making output values of the detection unit 23 to correspond to five emotional models: neutral, happy, disgusted, angry, and sad, among the aforesaid seven emotional models. In the map, values obtained from the detection unit 23 are distributed in the vertical axis "pleasant-unpleasant" and in the horizontal axis "sleeping-busy" under the conditions that if rubbed continuously, it means "pleasant", if held in place, it means "unpleasant", if touched often, it means "busy", and if left alone, it means "sleeping". According to this map, for example, if the user continuously rubs the robot 1, the robot 1 displays happiness as its pseudo-emotion, if the user holds the robot 1 in place a few times, the robot 1 displays disgust as its pseudo-emotion, if the user holds the robot 1 in place many times, the robot 1 displays anger as its pseudo-emotion, and accordingly, the pseudo-emotions are generated which can correspond to expressions or behavior of dislike and expressions or behavior of joy generally found in animals including humans.

In the above, in addition to the corresponding relationship between the output information of the rubbing/hitting detection unit 23 and the emotional models, the information on the state of the user or the information on the user's intention/emotional expression from the other detection units 21, 22, and 24 can be used in combination with the relationship. For example, even if the manner of rubbing is in the disgusted range, if the user's state is judged to be good based on the facial expression detection unit 21 and/or the sound/voice detection unit 24, it is judged that the user is simply playing with the robot and holding the robot, the ultimate pseudo-emotion of the robot remains neutral, not disgusted. Accordingly, the map, which makes the information on the user's state and the information on the user's intention/emotional expression correspond to the seven basic emotional models, can be constructed.

Figure 6:
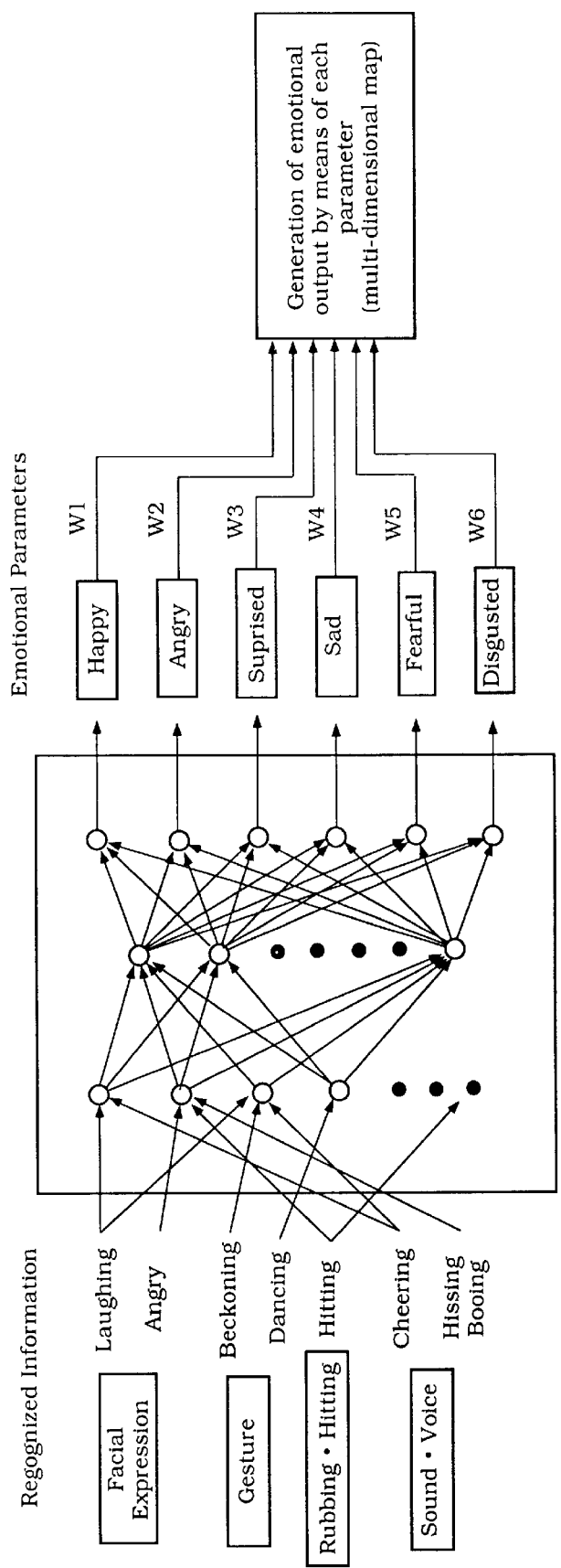
FIG. 6 is a schematic diagram showing a neural network usable for generating the pseudo-emotions at the pseudo-emotion generation unit 32 illustrated in Figure, wherein the user's state, which is recognized based on the user's facial expressions, gestures, rubbing/hitting behavior, voices, or the like, is used as input, and basic emotional models are outputted.

In the above, if generation of the pseudo-emotions at the pseudo-emotion generation unit 32 is conducted using a neural network, as shown in FIG. 6, the user's state (such as laughing or angry) recognized based on the user's facial expressions, gestures, rubbing/hitting behavior, voices, or the like is used as input, and basic emotional models are outputted (six models in FIG. 6). The neural network is made to learn in advance the relationship between such input and output, and to output, as parameters, coupling loads wn (n=1–6) of each basic emotional model corresponding to the user's state. Based on the coupling load of each basic emotional model, an ultimate pseudo-emotion is determined using, for example, a multi-dimensional map.

As described above, if the pseudo-emotion generation unit 32 is formed by a control logic capable of learning, the pseudo-emotion generation unit 32 may be constructed so as to recognize the user's reaction in response to robot's own behavior based on the information obtained from the intention/emotional expression detection unit 31; to evaluate adequacy of the pseudo-emotion generated based on the user's reaction; and if the generated pseudo-emotion is judged to be unnatural, to adjust the relationship between input information and output information in such a way as to generate a natural pseudo-emotion in accordance with the user's state and/or the user's intention/emotional expression at the moment; and to thereby learn the results of adjustment.

Preferably, this pseudo-emotion generation unit 32 can generate the pseudo-emotions by subdividing each of the aforesaid seven basic emotional models into several levels. For example, the happy model can be subdivided into several levels to generate pseudo-emotions containing the degree of happiness (e.g., a degree from "very happy" to "slightly happy"). In this case, the pseudo-emotion generation unit 32 may be formed so as to adjust pseudo-emotion generation algorithms per subdivided level and to undergo learning accordingly.

The information on the generated pseudo-emotions is outputted to the behavior decision means 40, and used, at the behavior decision means 40, as information for performing emotional behaviors, as standard information for putting priority to several behaviors as described later, and as comparison information for evaluating the information related to the user's reaction obtained from the intention/emotional expression recognition unit 31.

Ambient Environment Memory Unit and Movable Range Recognition Unit

An ambient environment memory unit 34 successively memorizes information related to the ambient environment inputted from the ambient environment detection unit 25. A movable range recognition unit 33 recognizes the range where the robot 1 can actually move based on the information from the ambient environment detection unit 25 and the ambient environment memory unit 34.

The information related to the recognized movable range is outputted to the behavior decision unit 40.

Preference/Habit Learning Unit

The preference/habit learning unit 35 constantly receives information related to the user's intentions/emotional expressions recognized at the intention/emotional expression recognition unit 31, determines the user's preferences and/or habits based on the user's intentions and/or emotional expressions and undergoes learning the same, and outputs the information to the intention/emotional expression recognition unit 31 as one piece of information for recognizing the user's intentions/emotional expressions.

In addition, the output from the preference/habit learning unit 35 is also inputted into an information-searching unit 36.

Information-Searching Unit, Information Memory Unit, Information integration/Processing Unit The information-searching unit 36 searches for adequate information for the user's preference/habits obtained at the preference/habit learning unit 35 using the external information source 9, and makes the information memory unit 37 memorize the result. An information integration/processing unit 38 integrates the searched information and the memorized information, processes the information (e.g., selects necessary information), and outputs the result to the behavior decision means 40.

Behavior Decision Means

As described above, all of the information related to the user's intention/emotional expression recognized at, for example, each recognition unit and each generation unit, the information related to the pseudo-emotions of the robot, the information related to the movable range, and the information related to the user's intentions/emotional expressions are used as standards for target-achievement action, the information related to the pseudo-emotions of the robot is used as standards for emotional behaviors, and the information related to the movable range is used as standards for obstacle-avoiding action.

The behavior decision means 40 comprises a behavioral type artificial intelligence system, and is formed by an appropriate growth system which evaluates discrepancy between the pseudo-emotions actually arising in the robot 1 and the pseudo-emotions of the robot 1 recognized by the user, and makes the behavioral type artificial intelligence system undergo adjustment, learning, and/or evolving.

In practice, the behavior decision means 40 decides which actions, i.e., target-achievement action, emotional behavior, or obstacle-avoiding action, or wandering when no order is given, the robot 1 is made to activate, by setting the order of priority on each behavior.

In practice, the target-achievement action includes an action directly in accordance with the target the user intends, i.e., an action such that when the user orders "run", the robot "runs".

The emotional behavior includes actions basically residing in emotions, such as an expression of happiness by indicating a smiling face on the display 10 while displaying dancing behavior by going back and forth or turning around using the drive means 14 when the pseudo-emotion is "happy", and an expression of anger by indicating a angry face on the display 10 while rushing straight using the drive means 14 when the pseudo-emotion is "angry".

Further, the object-avoiding action includes an action to avoid an obstacle, and the wandering when no order is given includes a repeating action such as going forward or changing directions without targets.

Setting the order of priority on each behavior (i.e., emotional behavior, target-achievement action, obstacle-avoiding action, and wandering) is conducted based on the pseudo-emotion of the robot 1 generated at the pseudo-emotion generation unit 32.

Figure 7:
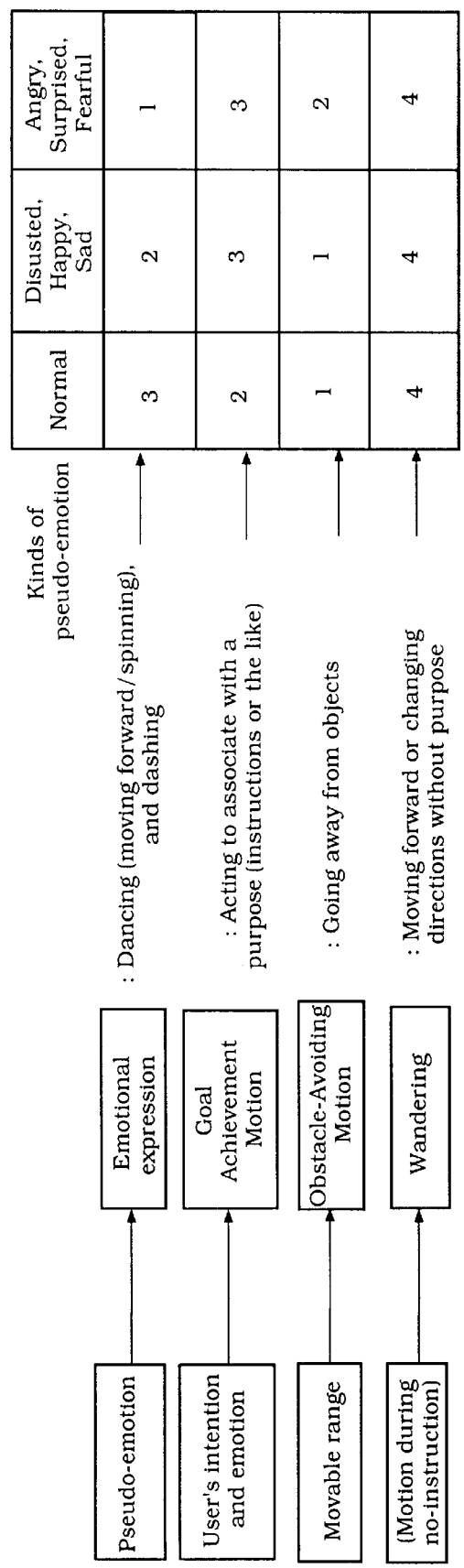
FIG. 7 is a schematic diagram showing an example of setting the order of priority on each behavior based on the pseudo-emotion of the robot.

FIG. 7 is a schematic diagram showing an example of setting the order of priority on each behavior based on the pseudo-emotion of the robot. As shown in this figure, in this embodiment, when the pseudo-emotion is "neutral", the obstacle-avoiding action takes priority over the other actions, followed by the target-achievement action, i.e., the order of priority is set in order to make the robot act as an obedient robot, which suppresses robot's own pseudo-emotional drive, toward the user. When the pseudo-emotion is "disgusted", "happy", or "sad", the obstacle-avoiding action takes priority over the other actions, followed by the emotional behavior, i.e., the order of priority is set in order to allow the robot to express its own pseudo-emotions by, e.g., going away angry or being sad due to the robot's action which was adverse to the user's intention, or treading on air due to happiness. Further, when the pseudo-emotion is "angry", "surprised", or "fearful", the emotional behavior takes priority over the other actions, i.e., the order of priority is set in order to allow the robot to express its own pseudo-emotions such as an surprised expression when the robot keeps going forward even if the robot hits an obstacle.

After completion of selection of behavior based on the above order of priority, the behavior decision means 40 operates the display 10, the speaker 12, and the drive means 14 in order to take action suitable for the contents of behavior selected by the robot.

Figure 8:
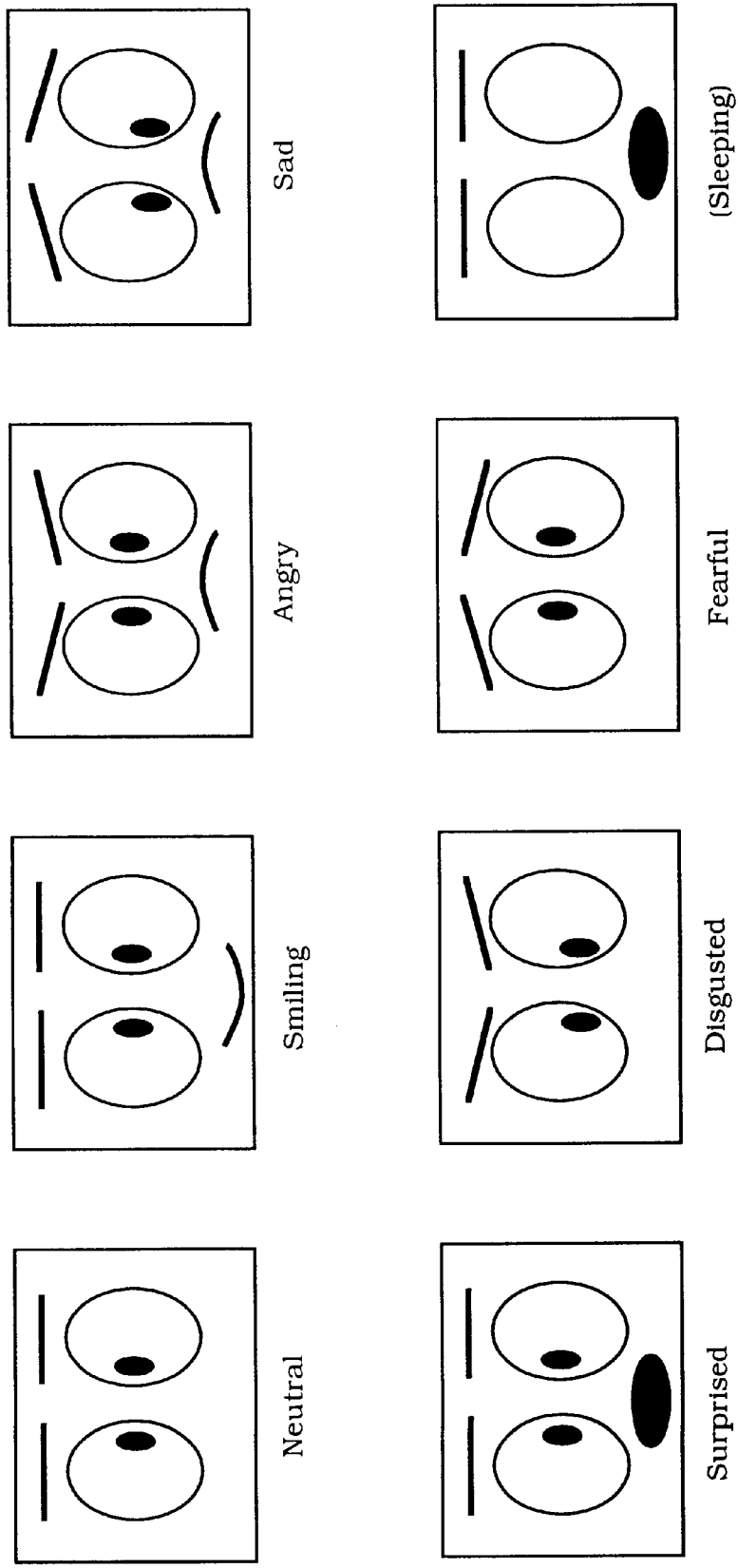
FIG. 8 is a schematic diagram showing facial expression patterns which may be indicated on the display 10 to express the pseudo-emotion of the robot.

In practice, the display 10 selects a facial expression suitable for the pseudo-emotion of the robot at the moment among several facial expression patterns such as those indicated in FIG. 8, and displays the selected facial expression. In addition, when the user requests the display of certain information, the display 10 can display the information by request instead of the facial expressions, or both the information and the facial expressions.

The speaker 12 outputs a voice suitable for the pseudo-emotion of the robot at the moment (such as laughing sounds when the pseudo-emotion is "happy"), an answer in response to the user's request when the target-achievement action is given priority, or adequate effective sounds, by synthesizing appropriate sounds.

The drive means 14 drives according to the behavior taking priority.

In the above, a decision method will be explained in detail when the behavior decision means 40 selects emotional behavior. The behavior decision means 40 learns in advance the relationship between each of the basic seven emotional models (preferably each level of each model) and plural patterns of behavior corresponding thereto. For example, when the pseudo-emotion of the robot becomes "angry" as a result of a situation where the user fixedly touches the approach-sensing sensor 6 and maintains the situation, the display 10 is made to display the facial expression of "angry" and the drive means 14 is made to go back to escape from the user's hand and to stop when the hand is detached from the sensor. When the pseudo-emotion is "happy", the display 10 is made to display the facial expression of "smiling face" and the drive means 14 is made to move in combination of going back and forth and turning around.

Learning at Behavior Decision Means

The behavior decision means 40 judges how the user recognizes the pseudo-emotion of the robot 1, which was aroused in response to the user's reaction which arose in response to robot's own behavior, based on the information obtained from the intention/emotional expression recognition unit 31, and the behavior decision means 40 evaluates the behavior decision algorithms at the behavior decision unit 40, based on the discrepancy between the pseudo-emotion recognized by the user and the pseudo-emotion actually aroused in the robot.

If no discrepancy is found, the behavior decision unit 40 is judged to optimally act expressing the pseudo-emotions, and the behavior decision algorithms remain the same. If the actual pseudo-emotion of the robot and the pseudo-motion recognized by the user are different, the discrepancy is determined, and the relationship between the pseudo-emotion and the behavior in the behavior decision algorithms at the behavior decision means 40 is adjusted to eliminate the discrepancy. For example, despite the pseudo-emotion of anger aroused in the robot 1, the user recognizes that the pseudo-emotion is "disgusted".

In the pseudo-emotions, for example, each of the basic seven emotional models is subdivided into levels 1 to 3, and the behavior decision algorithms have learned the relationship between the emotional model "joyful" and the behavior as follows:

(1) "Joyful level 1 (slightly joyful)=going around with a smiling face."
(2) "Joyful level 2 (joyful)=dancing around while laughing with a smiling face."
(3) "Joyful level 3 (very joyful)=dancing around while loudly laughing with a smiling face."

If the robot recognizes based on the user's reaction "the user recognizes that the robot is very joyful (the pseudo-emotion: joyful level 3)" as a result of behavior expressing "joyful level 2" by the robot, the behavior decision means 40 learns the relationship between the emotional model "joyful" and the behavior in order to match the pseudo-emotion of the robot being recognized by the user and the pseudo-emotion aroused in the robot as follows:

(1') "Joyful level 1 (slightly joyful)=running around with a smiling face."
(2') "Joyful level 2 (joyful)=dancing around with a smiling face."
(3') "Joyful level 3 (very joyful)=dancing around while laughing with a smiling face."

As described above, by adjusting the relationship between the pseudo-emotion and the behavior in the behavior decision algorithms based on the reaction by the user, appropriate emotional behavior corresponding to the pseudo-emotions can be established.

Effects Exhibited in The Embodiment

As explained above, because the robot 1 sets the order of priority on several behavior patterns based on the pseudo-emotions of the robot, the robot 1 is always allowed to regulate to certain degree its behavior based on its pseudo-emotions, not only when the emotional behavior takes priority over the other behaviors.

The robot 1 described above is formed in such a way as to adjust the user's intention/recognition algorithms, emotion generation algorithms, and behavior decision algorithms and to learn them based on the reaction by the user in response to the robot's own behavior, and thus, the recognition efficiency of recognizing intentions/emotions increases, thereby establishing pseudo-emotions and emotional expressions.

The robot 1 described above detects the user's state in visual, tactile, and auditory manner as do humans, and acts upon generation of pseudo-emotions based thereon. Thus, natural communication between humans and robots can be performed, i.e., more human like communication can be established.

Further, the robot 1 sets the order of priority on behaviors based on its pseudo-emotions. Thus, the robot sometimes acts entirely unexpectedly, and will not make the user tired of playing with the robot.

Second Embodiment: Vehicle

Figure 9:
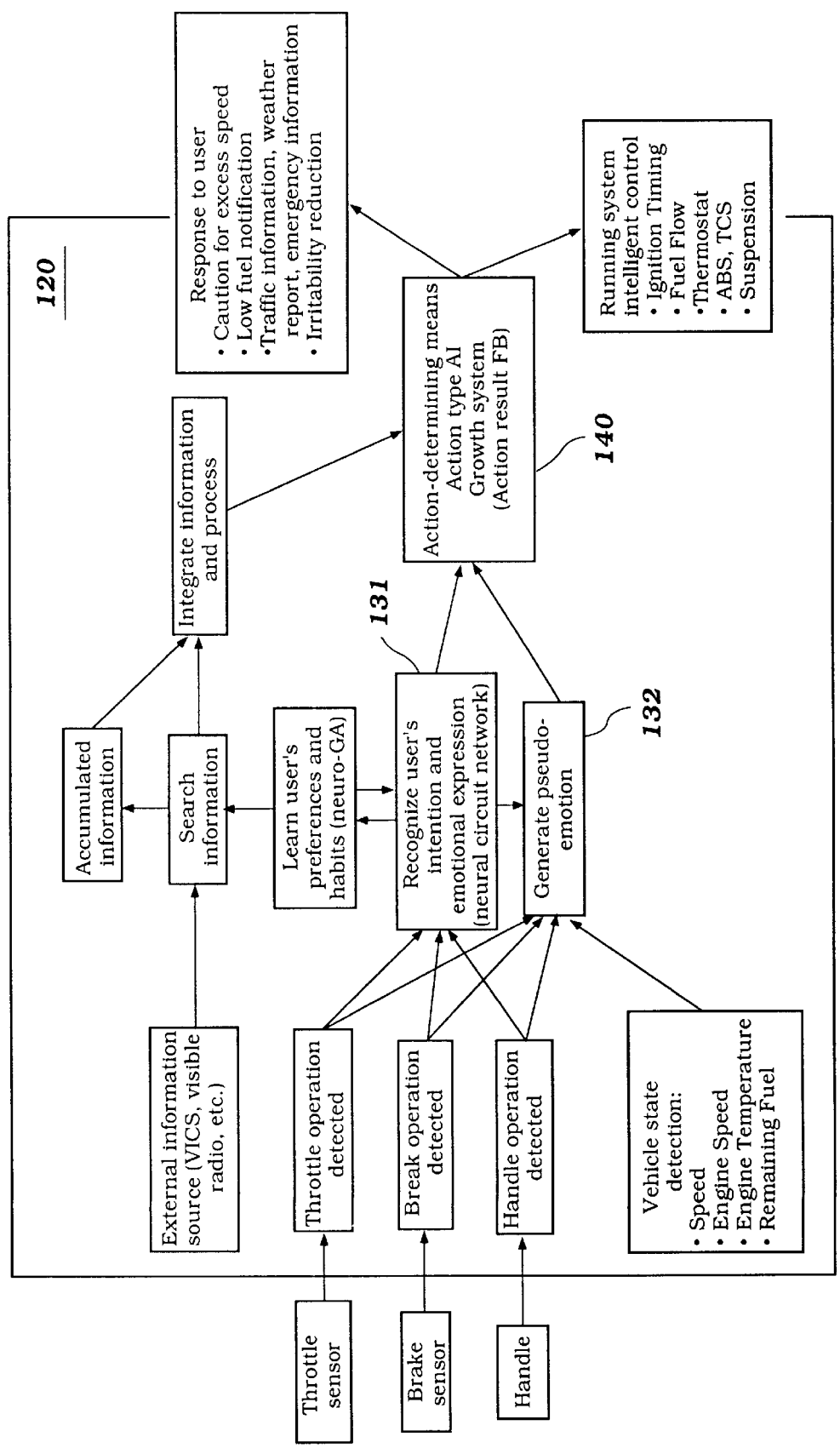
FIG. 9 is a schematic diagram showing a second embodiment of the present invention wherein the control system of the present invention is applied to a vehicle such as a two-wheeled vehicle.

FIG. 9 is a schematic diagram showing a second embodiment of the present invention wherein the control system of the present invention is applied to a vehicle such as a two-wheeled vehicle.

In this embodiment, the user's state is detected based on the driving state detected by, for example, a throttle sensor, a brake sensor, or a sensor sensing handle bar operation (hereinafter, referred to as "handle bar sensor").

In practice, based on detection information from the throttle sensor, information related to the user's throttle operation is detected; based on detection information from the brake sensor, information related to the user's brake operation is detected; and based on detection information from the handle bar sensor, information related to the user's handle bar operation is detected.

An intention/emotional expression recognition unit 131 may comprise a neural network, for example, which receives information about the user's preference and habits obtained from a preference/habit learning unit 134, as well as information related to throttle operation, brake operation, and handle bar operation (hereinafter, these pieces of information are referred to as "information related to a vehicle-operating state"), and which recognizes the user's intentions/emotional expressions based on the user's vehicle-operating state and the user's preference/habits. The basic principle of the intention/emotional expression unit 131 is the same as in the intention/emotional expression unit 31 in the first embodiment, and thus, its detailed explanation will be omitted.

A pseudo-emotion generation unit 132 stores basic emotional models obtained by categorizing pseudo-emotions required by the vehicle into several emotional patterns which are, for example, neutral, disgusted, happy, sad, surprised, angry, and fearful. The pseudo-emotion generation unit 132 receives information related to the user's vehicle-operating state as well as information related to vehicle's state itself such as velocity, engine r.p.m's., engine temperature, and the remaining fuel volume, and generates its own pseudo-emotion using a neural network or a map which has learned the relationship between the input information and the aforesaid basic emotional models.

Figure 10:
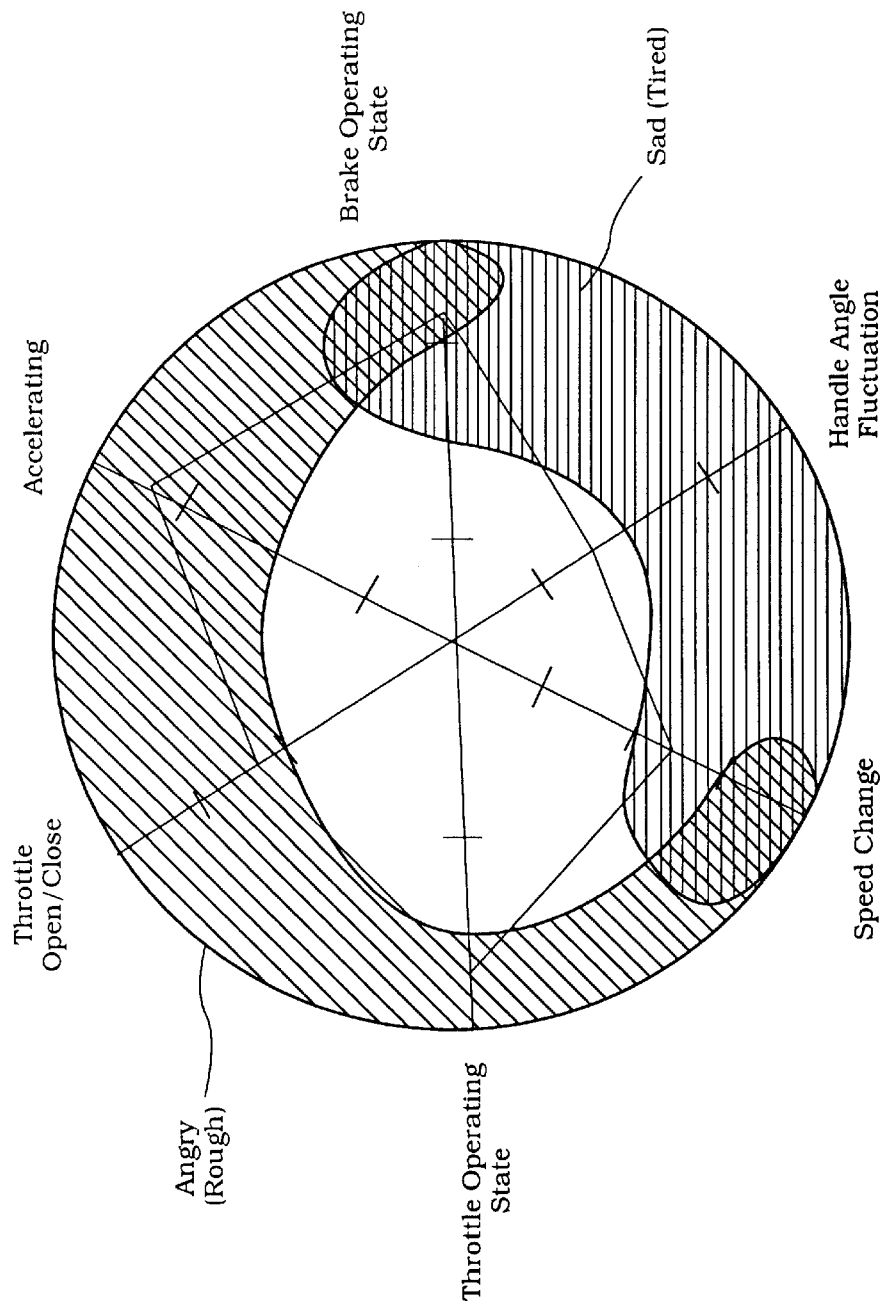
FIG. 10 is a schematic diagram showing the relationship between the basic emotional models and the user's vehicle-operating state and the vehicle's driving state.

The relationship between the basic emotional models and the user's vehicle-operating state and the vehicle's driving state itself is determined by using as standards, for example, the changes in velocity, the throttle-operating state, the throttle angle, the acceleration state, the brake-operating state, and the changes in the handle bar angle and by making them correspond to the basic emotional models, as shown in FIG. 10. In the relationship indicated in FIG. 10, it is judged that the higher the indices of the speed change, the throttle-operating state, the throttle angle, the accelerating state, and the brake-operating state, the rougher the driving operation by the user becomes, whereby the basic emotional model becomes "angry". Also, it is judged that the higher the indices of the brake-operating state, the handle bar-operating state, and the speed change, the higher the degree of the user's tiredness becomes, whereby the basic emotional model becomes "sad".

Preference/Habit Learning Unit and Other Units

The basic principles of a preference/habit learning unit, an information-searching unit, an information memory unit, and an information integration/processing unit are the same as in the first embodiment, and thus, detailed explanation will be omitted.

Behavior Decision Means

A behavior decision means 140 receives information related to the user's intentions/emotions obtained at the intention/emotional expression unit 131 as standards for target-achievement action, and receives information related to the pseudo-emotions of the vehicle as standards for emotional behavior, and gives priority to the target-achievement action and the emotional behavior based on the aforesaid pseudo-emotion, thereby determining either the target-achievement action or the emotional behavior, based on the order of priority.

In the above, for example, the target-achievement action includes an action which simply targets the user's throttle operation, brake operation, or handle bar operation, thereby operating the throttle or the like.

Emotional behaviors include actions urging as priority the user to take a rest using signals or voices when the pseudo-emotion is "sad".

Practical operation means include driving operation subjected to control related to driving performance of the vehicle such as control over ignition timing, fuel flow, thermostat, ABS, TCS, and suspension; an action of warning the user in a visual or auditory manner, e.g., warning when driving at excessive speeds or when running out of gas; and an action pf releasing the user's stress by providing traffic information, weather reports, or news flashes.

In addition, the operation means also include a means for indicating the pseudo-emotion of the vehicle, wherein the user can judge the vehicle's pseudo-emotions and can operate the vehicle in such a way as to make the vehicle happy, thereby performing adequate driving.

The intention/emotional expression unit 131, the pseudo-emotion generation unit 132, and the behavior decision means 140 adjust, as does the controller in the first embodiment, the user's intention/recognition algorithms, emotion generation algorithms, and behavior decision algorithms and learn the adjustments, using the user's reaction in response to its behavior as evaluation standards, and thus, the recognition efficiency of recognizing intentions/emotions increases, thereby establishing its pseudo-emotions and emotional expressions.

Third Embodiment: Air Conditioner

Figure 11:
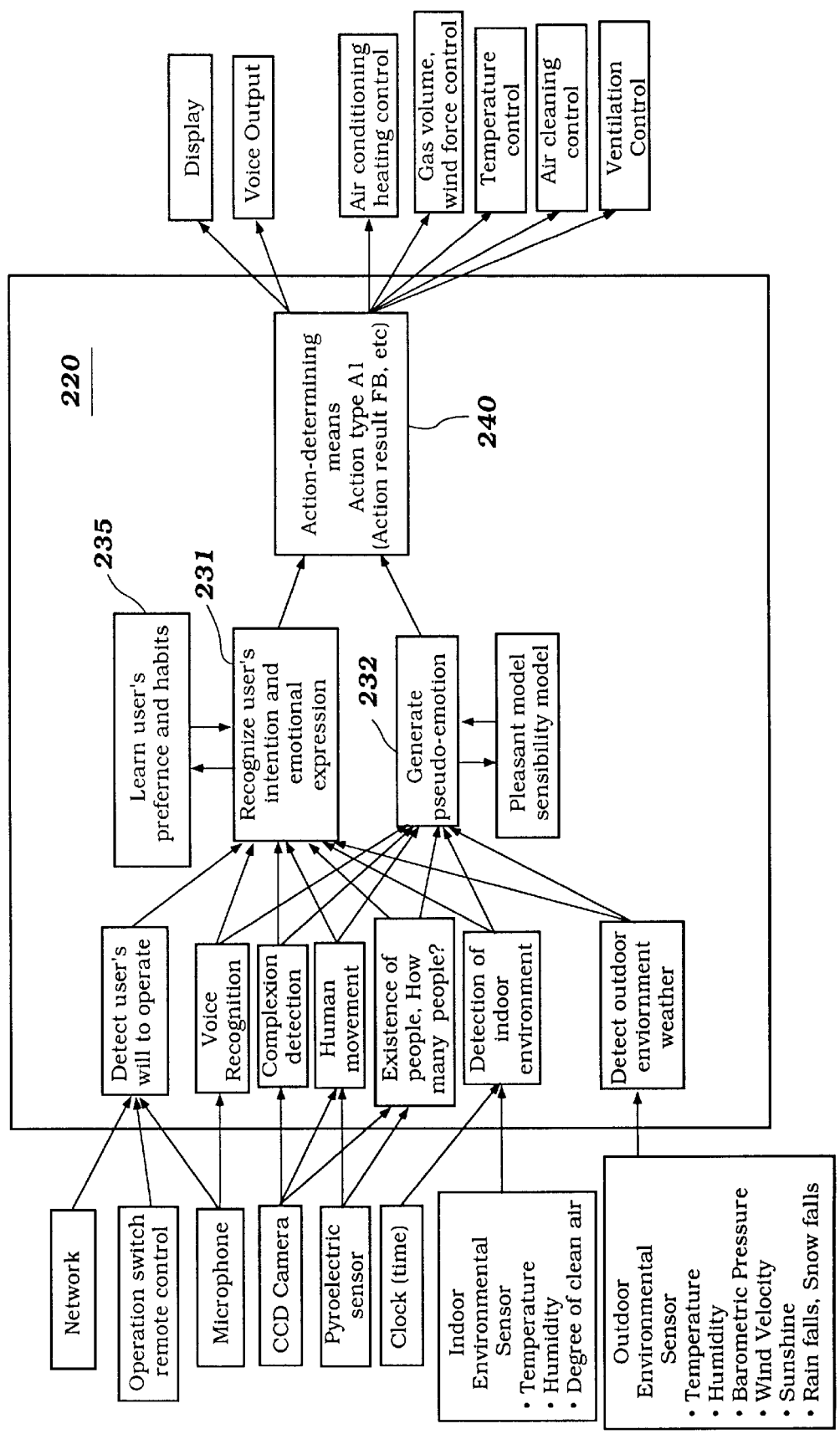
FIG. 11 is a schematic diagram showing a controller 220 in a third embodiment of the present invention, wherein the control system of the present invention is applied to an air conditioner.

FIG. 11 is a schematic diagram showing a controller 220 in a third embodiment of the present invention, wherein the control system of the present invention is applied to an air conditioner.

In this embodiment, the controller 220 detects the user's state and surrounding environment, and based on the detected information, generates the pseudo-emotion of the air conditioner itself, and recognizes the user's intentions/emotional expressions.

The air conditioner comprises, for example, a remote controller for switch operation, a microphone, a CCD camera, and a pyroelectric sensor as means for detecting information related to a state of the user(s), and a clock, an indoor environment sensor (detecting, for example, temperature, humidity, and degree of cleanness of air), and an outdoor environment sensor (detecting, for example, temperature, humidity, barometric pressure, wind velocity, sunshine, rainfalls, and snowfalls) as means for detecting using environment, and further, an external information source such as a network.

The controller 220 detects intentions of user(s) based on information obtained form the external information source, the operation switch remote controller, and the microphone; detects voices of the user(s) using an appropriate voice recognition means based on information obtained from the microphone; detects sounds made inside and outside the room including noises; detects facial expressions and complexion of the user(s) based on information obtained from the CCD camera; detects movement of user(s), existence of user(s), and the number of user(s) based on information obtained from the CCD camera and pyroelectric sensor; detects indoor environment based on information obtained from the indoor environment sensor; and detects outdoor environment or weather based on information obtained from the outdoor environment sensor.

An intention/emotional expression recognition unit 231 and a pseudo-emotion generation unit 232 recognize intentions/emotional expressions of the user(s) and generate pseudo-emotions of the air conditioner itself, based on the detected state of the user(s) and the detected using environment by using the aforesaid detection means.

Figure 12:
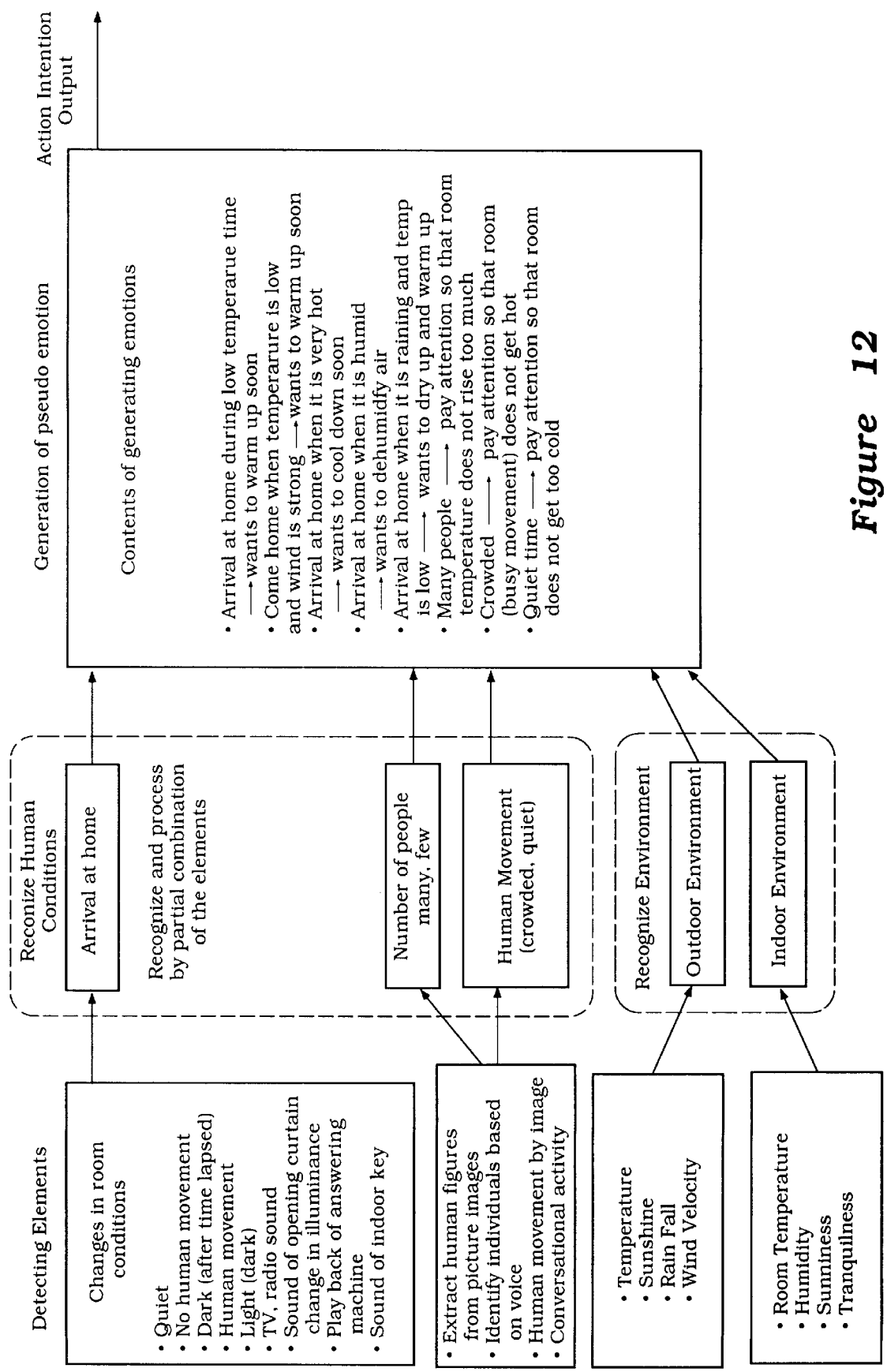
FIG. 12 is a schematic diagram showing the relationship between the detection elements, the recognized user's state, and the generated pseudo-emotion.

In practice, as shown in FIG. 12, if the pseudo-emotion generation unit 232 for generating pseudo-emotions detects that the room is quiet based on information from the microphone, detects no movement by user(s) based on information from the proelectric sensor, and detects that the room is dark based on information from the CCD camera, and after the above conditions continue for a given time period, if the proelectric sensor detects movement of user(s), the CCD camera detects light, the microphone detects the sound of a key in a door, sounds of a TV or radio, the sound of a curtain closing, and/or sound of a playback of a voice mail device, then the pseudo-emotion generation unit recognizes the arrival of user(s) at home based on a combination in part of the foregoing detections. Further, the pseudo-emotion generation unit recognizes the number of user(s) who arrived using an appropriate image recognition means based on information from the CCD camera, identifies the individual user(s) using an appropriate voice recognition means based on information from the microphone, recognizes whether the movement is active or slow, recognizes the indoor environment such as room temperature, humidity, sunniness, and tranquilness based on information from the indoor environment sensor, and detects the outdoor environment such as temperature and weather based on information from the outdoor environment sensor, and based on the foregoing recognized information, if, for example, the indoor and outdoor temperatures are judged to be low at arrival of the user(s), then the pseudo-emotion generation unit generates a pseudo-emotion "want to warm up", and if the indoor and outdoor temperature is judged to be low and outdoor winds are judged to be strong at arrival of the user(s), then the pseudo-emotion generation unit generates a pseudo-emotion "want to warm up quickly".

The above-described pseudo-emotion generation can be achieved by storing pseudo-emotion models required of the air conditioner, and by causing a neural network to learn the relationship between the pseudo-emotions and the various recognized data or by using a map defining correspondence between the pseudo-emotions and the recognized information.

In the above, the relationship between the pseudo-emotions and the recognized information further includes, for example, "want to cool down quickly" if it is hot when user(s) arrive(s), "want to provide refreshing and dehumidified air" if it is hot and humid when user(s) arrive(s), "want to prevent getting hot" if there are many people or users, and "want to prevent getting chilled or too cold" if it is quiet.

Like the pseudo-emotion generation unit 232, an intention/emotional expression recognition unit 231 may comprise a neural network which learns in advance the relationship between the recognized information and the intentions/emotional expressions of the user(s) to output to a behavior decision means 240 the intentions/emotional expressions of the user(s) at the moment such as actual desire of ventilation which is not expressly ordered by the user(s) but which is recognizable based on information such as the user's complexion related to feeling of the user, in addition to the particularly set temperature controlled via the switch operation remote controller.

In the above, the information on the intentions and emotional expressions of the user(s) recognized at the intention/emotional expression recognition unit 231 is also used as teacher data for a preference/habit learning unit 235, and the preference/habit learning unit 235 undergoes learning the preferences and/or habits of the user(s) by adding them, and outputs the result of learning to the intention/emotional expression recognition unit 231 as one piece of the information used for recognizing the intentions/emotional expressions of the user(s).

The behavior decision means 240 receives information related to the pseudo-emotions of the air conditioner itself in addition to information related to the recognized intention/emotional expressions of the user(s); conducts control such as cooling/heating capacity control, wind flow control, wind direction control, air purifier control, and ventilation control based on a control value which is obtained by summing a target-achievement operation value based on the intentions/emotional expressions of the user(s) and a pseudo-emotion operation value based on the pseudo-emotions; and as necessary, informs the user(s) of temperature and/or humidity by using a display or voice output.

Detection of Dissatisfaction and Learning

In addition, the intention/emotional expression recognition unit 231 also recognizes the intention/emotional expression of the user(s) regarding dissatisfaction based on reaction by the user(s) in response to the behavior or performance of the air conditioner regulated by the aforesaid behavior decision means 240; and based on the recognition result, adjusts the recognition algorithms at the intention/emotional expression recognition unit 231 and the behavior decision algorithms at the behavior decision means 240, followed by learning the changes.

Figure 13:
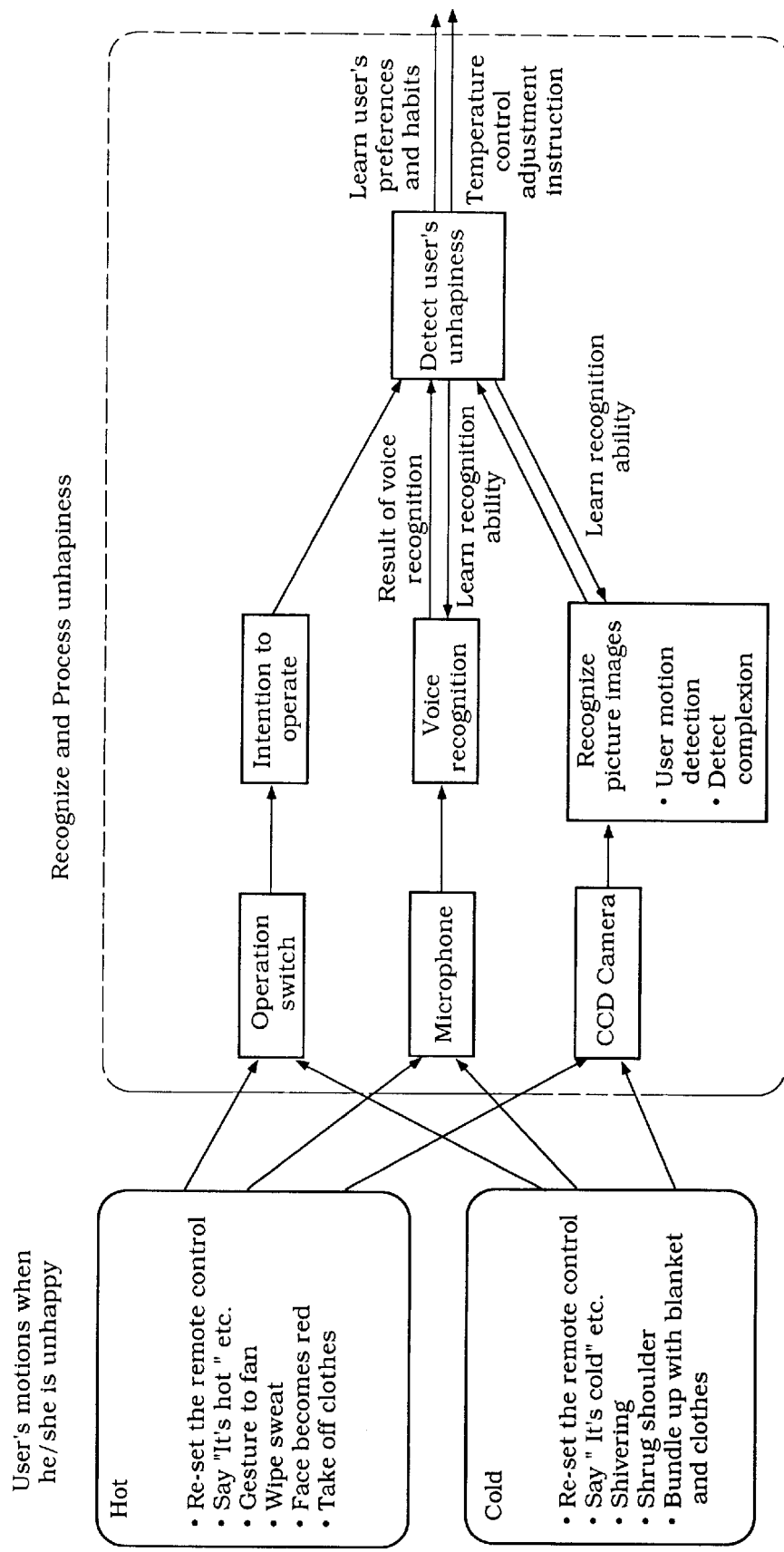

The dissatisfaction detection will be explained with reference to dissatisfaction with temperature control. As shown in FIG. 13, actions expressed when the user is dissatisfied with the temperature, such as re-setting the remote controller, pronouncing a word "hot" or "cold", and performing gestures such as fanning himself or herself and shrinking, are detected by detection means such as a operation switch, microphone, and CCD sensor; and according to the detected information, the operation value is recognized or the meaning of words is recognized by using an appropriate voice recognition means. Further, behavior or complexion of the user is detected using an appropriate image recognition means, and if the user is judged to perform an action observed when dissatisfied with temperature, the user's dissatisfaction is established.

The controller adjusts the aforesaid recognition algorithms and the behavior decision algorithms based on the detected dissatisfaction, and learns the results, and also learns the user's preferences/habits, whereby the recognition efficiency of recognizing intentions/emotions increases, and its pseudo-emotions and emotional expressions are becoming established.

Effects Exhibited in The Third Embodiment

As explained above, because the air conditioner recognizes the intentions/emotional expression of the user(s) by taking the preference/habits of the user(s) into account, temperature control, for example, with consideration of each individual user's preferences/habits, can be conducted for a user who has a habit to always raising the set temperature from the temperature the user actually desires, or a user who cannot tolerate the heat and prefers a relatively low temperature. As a result, the air conditioner allows providing satisfactory environment to the user(s) whose unexpressed intentions/emotional expressions are satisfied.

Further, according to the above third embodiment, because the air conditioner is constructed so as to conduct, for example, temperature control by adding the emotional behavior based on its own pseudo-emotions to the target-achievement action based on the user's intentions/emotional expressions, the air conditioner can provide environment optimal to the state of the user(s) even if no order is given.

Other Embodiments

In the first embodiment, the CCD camera, for example, is used as means for detecting the state of the user(s) or the using environment. However, the detection means can be any means which are capable of detecting the state of the user(s) or the using environment.

The structure of the robot in the first embodiment is not limited to the one indicated in FIG. 1. For example, the robot can be incorporated into a stuffed animal or a doll. Further, the use of the robot described in the first embodiment is not limited, and the robot can have various uses, e.g., a toy or a device for medical use.

Further, the drive means in the first embodiment is not limited, and for example, can be embodied as hands and feet or even a tail.

In the second embodiment, the driving state of the user is detected using the throttle sensor, brake sensor, and handle bar sensor, and based on the detected driving state, the intentions/emotional expressions are recognized and the pseudo-emotions are generated. However, the detection means are not limited thereto, and for example, indication showing a state of the user himself or herself such as the user's heartbeat or perspiration or facial expressions are detected, and based on the results, the intentions/emotional expressions can be recognized and the pseudo-emotions can be generated. Further, recognition of the intentions/emotional expressions and generation of the pseudo-emotions can be performed by using a combination of the state of driving operation and the state of the user himself or herself.

In addition, the detection means in the third embodiment are not limited, and any means which are capable of detecting the state of the user or outdoor environment can be used.

The object to be controlled in the present invention is not limited, and any objects, as in the first, second, and third embodiments, such as an outboard engine in a vessel, a robot used in machine tools, a motor used in electrically-driven vehicles, or the like can be controlled by adopting the control system of the present invention based on the same principle as in the aforesaid embodiments.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A control method for controlling operation of an object used by a user in an environment, said object capable of receiving signals of variable conditions which represent at least a state of the user and which are associated with operation of the object, said object capable of being programmed to behave in response to the received signals, and method comprising the steps of:

(a) defining pseudo-emotions of the object, which are elements for deciding output of the object, in relation to the signals;

(b) formulating emotion generation algorithms to establish the relationship between the signals and the pseudo-emotions;

(c) formulating behavior decision algorithms to establish the relationship between input, including the pseudo-emotions, and the behavior of the object;

(d) detecting signals of variable conditions and inputting the signals into the object;

(e) generating a pseudo-emotion of the object based on the signals using the emotion generation algorithms;

(f) determining the variable conditions from the signals;

(g) making the object behave based on the variable conditions and the pseudo-emotion using the behavior decision algorithms;

(h) evaluating reaction of the user in response to the behavior of the object;

(i) if the reaction of the user does not match the pseudo-emotion of the object in the emotion generation algorithms, adjusting and updating at least either of the emotion generation algorithms or the behavior decision algorithms, followed by learning the adjustment; and (j) repeating steps (d) through (i).

2. The control method according to claim 1, further comprising the steps of: recognizing an intention/emotional expression of the user based on the signals of variable conditions, and using the intention/emotional expression of the user as the signals for formulating the emotion generation algorithms and for generating the pseudo-emotion of the object.

3. The control method according to claim 1, further comprising the steps of: recognizing an intention/emotional expression of the user based on the signals of variable conditions, and using the intention/emotional expression of the user as the input for formulating the behavior decision algorithms and for deciding the behavior of the object.

4. The control method according to claim 2, further comprising the steps of: recognizing an intention/emotional expression of the user based on the signals of variable conditions, and using the intention/emotional expression of the user as the input for formulating the behavior decision algorithms and for deciding the behavior of the object.

5. The control method according to claim 2, further comprising the steps of deducing preference/habit of the user from the recognized intention/emotional expression of the user, learning the deduced result, and using the learned deduced result for recognizing the intention/emotional expression of the user.

6. The control method according to claim 3, further comprising the steps of deducing preference/habit of the user from the recognized intention/emotional expression of the user, learning the deduced result, and using the learned deduced result for recognizing the intention/emotional expression of the user.

7. The control method according to claim 3, wherein the behavior decision algorithms output at least a decision of target-achievement action corresponding to the recognized intention/emotional expression of the user and a decision of emotional behavior corresponding to the pseudo-emotion of the object, wherein the order of priority is set for each decision based on the pseudo-emotion of the object, and the behavior decision algorithms output either decision based on the order of priority.

8. The control method according to claim 1, wherein the signals of variable conditions are detected using sense-based detecting means.

9. The control method according to claim 1, wherein the signals of variable conditions are selected from the group consisting of the user's facial expression, gesture, manner of touching, and voice condition.

10. The control method according to claim 1, wherein the emotion generation algorithms are formulated using basic emotional models corresponding to plural emotional patterns, and output at least one emotional model as the pseudo-emotion.

11. The control method according to claim 10, wherein the emotion generation algorithms are formulated to select one emotional model from the basic emotional models based on the signals of variable conditions, and to output the emotional model as the pseudo-emotion.

* * * * *